March 11, 1930. A. F. KLASING 1,749,948
RAILWAY CAR HAND BRAKE
Original Filed Aug. 23, 1927 4 Sheets-Sheet 2

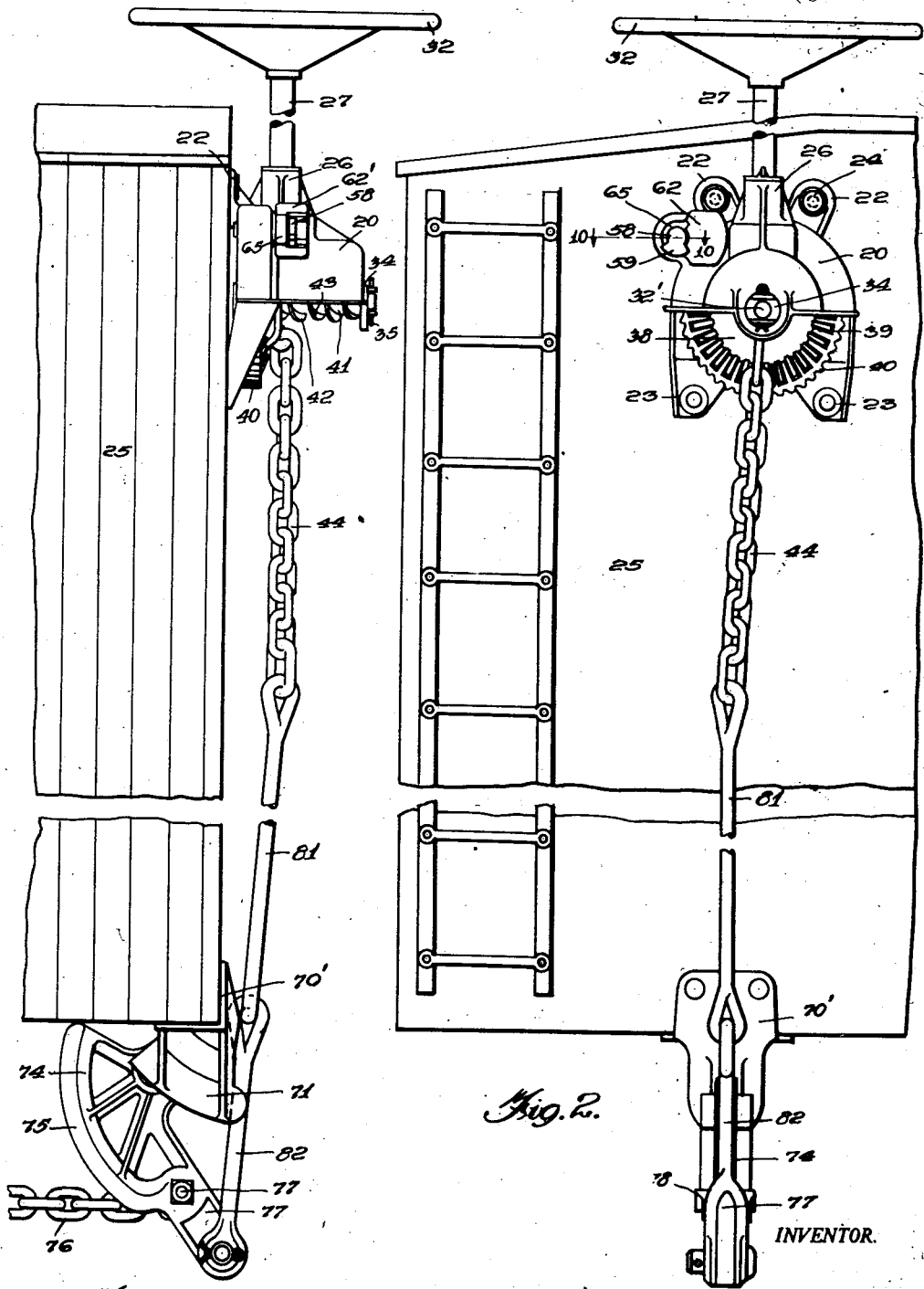

INVENTOR.
AUGUSTUS F. KLASING,
BY Jerry A. Mathews
ATTORNEY.

March 11, 1930.    A. F. KLASING    1,749,948
RAILWAY CAR HAND BRAKE
Original Filed Aug. 23, 1927    4 Sheets-Sheet 3

INVENTOR.
AUGUSTUS F. KLASING,
BY Jerry A. Mathens
ATTORNEY.

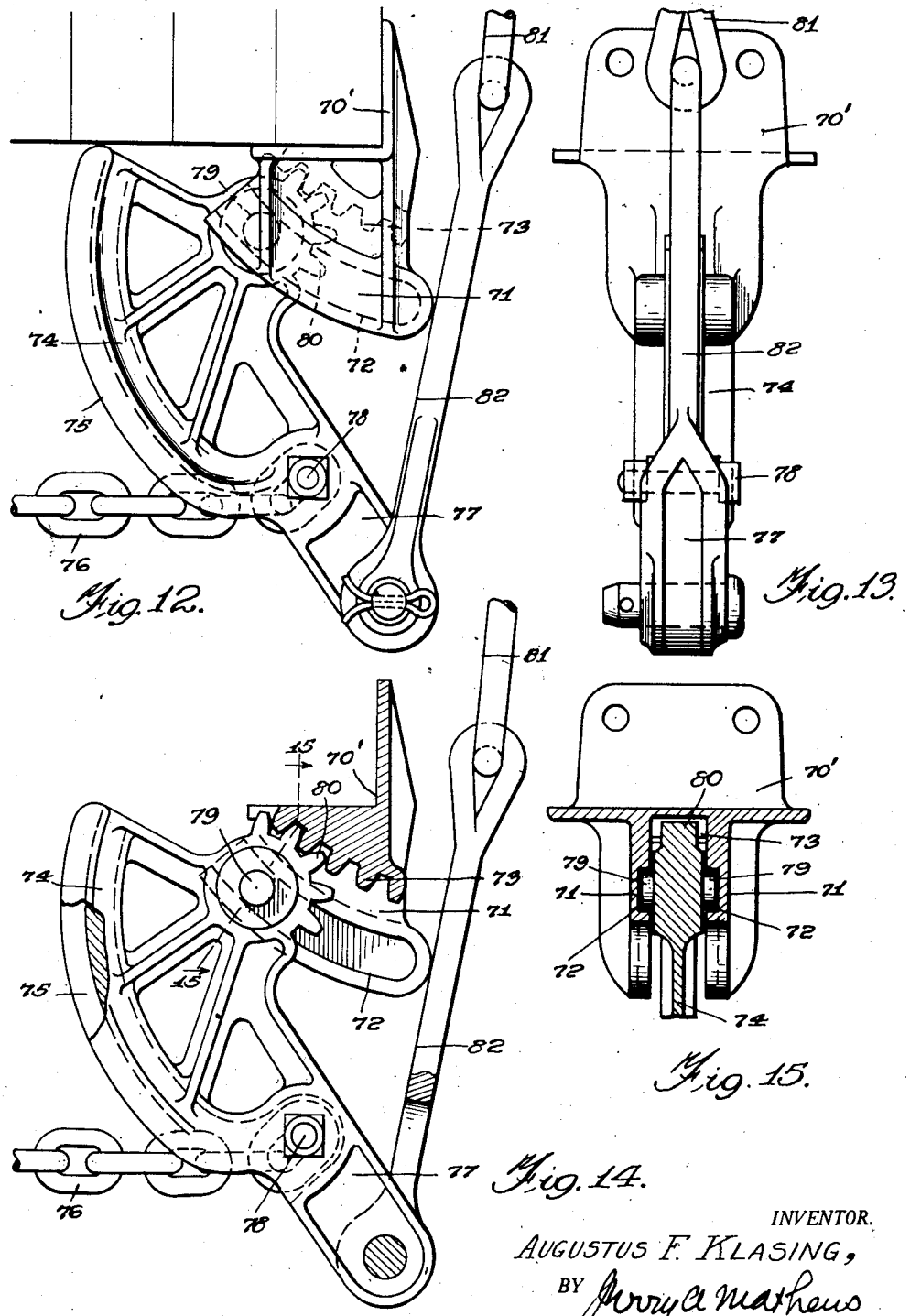

Patented Mar. 11, 1930

1,749,948

UNITED STATES PATENT OFFICE

AUGUSTUS F. KLASING, OF CHICAGO, ILLINOIS

RAILWAY-CAR HAND BRAKE

Application filed August 23, 1927, Serial No. 214,916. Renewed January 20, 1930.

My invention relates to railway car hand brakes and has particular reference to the operating mechanism of such brakes, which mechanism is preferably mounted at one end of the car and is adapted to pull upon a chain or the like, to apply power to the brake shoes beneath the car body.

The important object of my invention is to provide means of the above mentioned character so constructed that the requisite power is obtainable, by means of which the movement of the car can be regulated to the best possible advantage, and which may be operated by a wheel in the usual manner now well known to trainmen, and which by ease and convenience of operation will possess the maximum safety for the trainmen.

The hand brake mechanism by virtue of its application, design and operation is rendered so safe, convenient and effective that it is "fool proof" as near as is possible. The brake upper unit is secured to the car body near its top and end, and at such a distance above the brake step, to allow the operator, at all times, to have a clear and uninterrupted view, ahead of the car, while using the brake mechanism. The set and release means are conveniently located upon the top of the housing of the brake mechanism, just below the operating wheel or lever, allowing the operator to stand erect and free-footed, at all times. The mechanism is in plain sight from above and below and quickly and easily discernible as a power hand brake mechanism.

Figure 3:
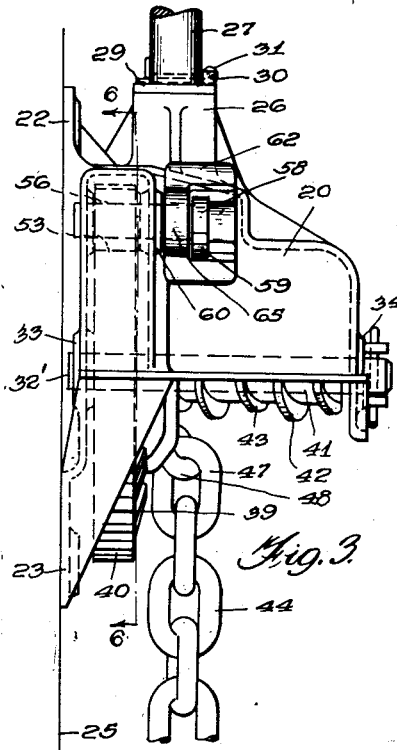
Figure 4:
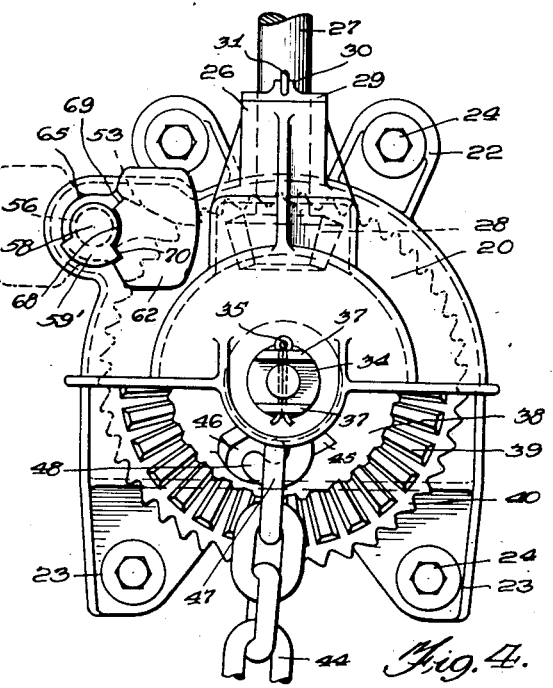
Figure 5:
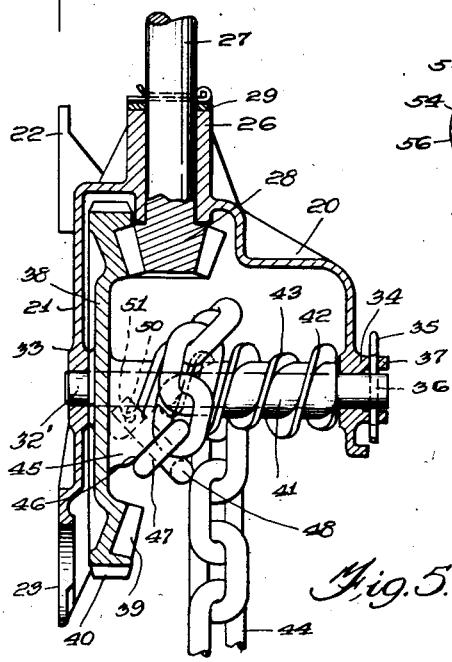
Figure 6:
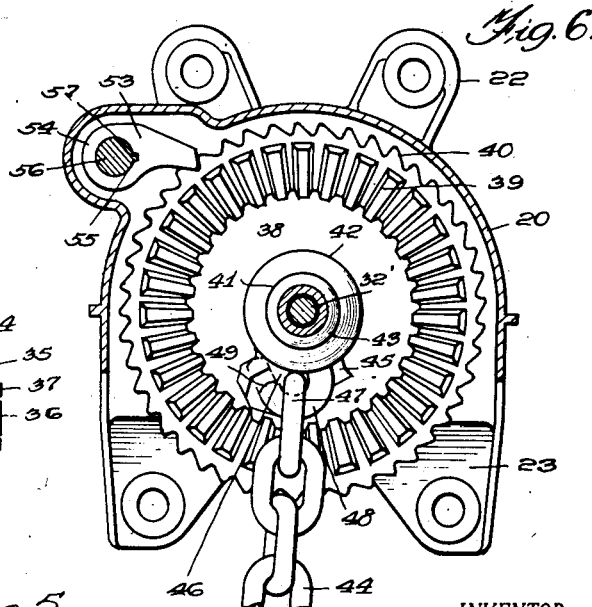
Figure 7:
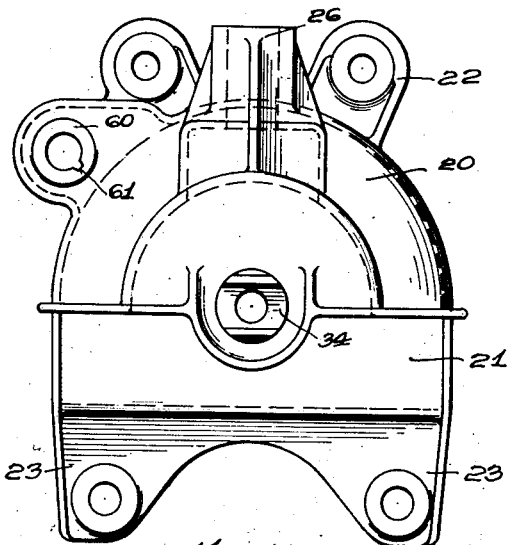
Figure 11:
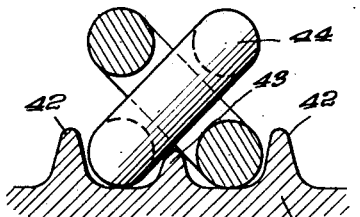
Figure 8:
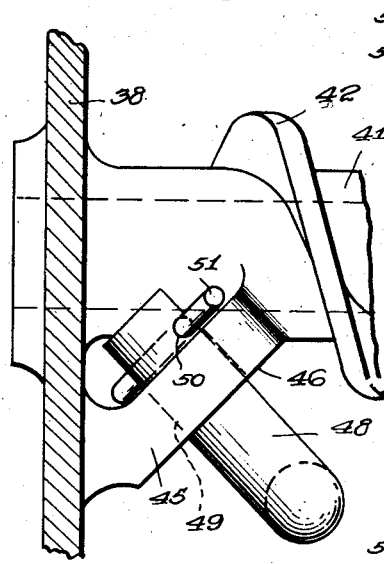
Figure 9:
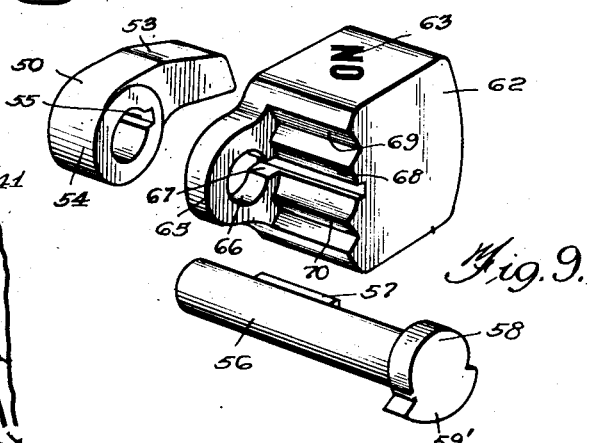
Figure 10:
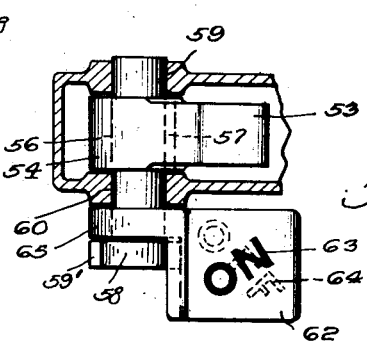

Other objects and advantages of the invention will be apparent during the course of the following description:

In the accompanying drawings forming a part of this specification and in which like numerals are employed to designate like parts through the same, Figure 1 is a side elevation of a hand brake mechanism embodying my invention, Figure 2 is an end elevation of same, Figure 3 is a side elevation of the housing and associated elements of the upper unit, Figure 4 is an end elevation of same, Figure 5 is a central vertical longitudinal section through the housing of the upper unit, parts in elevation, Figure 6 is a transverse section taken on line 6—6 of Figure 3, Figure 7 is an end elevation of the housing of the upper unit, parts removed, Figure 8 is an enlarged fragmentary side elevation of the winding drum, Figure 9 is a perspective view of the pawl and associated elements, Figure 10 is a plan view of the pawl and associated elements, the housing being shown in section taken on line 10—10 of Figure 2, Figure 11 is a partly diagrammatic section, extending longitudinally through the winding drum, illustrating the manner in which the chain is wound upon the same, Figure 12 is a side elevation of the lower unit, Figure 13 is an end elevation of same, Figure 14 is a side elevation of the lower unit, the housing being shown in vertical longitudinal section, and, Figure 15 is a transverse section taken on line 15—15 of Figure 14.

The upper unit of the brake mechanism embodies a housing 20, closed at the top and opened at the bottom, and this housing is carried by an inner vertical plate 21, preferably formed integral therewith. This plate is provided with apertured lugs 22, at its top and apertured extensions 23, at its bottom, for receiving bolts 24, or the like, to attach the housing to the car body 25. This housing is preferably located upon the end of the car body, adjacent to the top thereof. The housing provides a canti-lever bracket, and the housing is suitably reinforced with ribs, to prevent distortion of its shape, when subjected to undue strains.

The housing 20 is provided in its top with a vertical sleeve-bearing 26, rotatably receiving a vertical shaft or staff 27, extending above the same. Formed integral with the lower end of the shaft 27 is a bevel-pinion 28, operating within the housing 20. By forming the bevel-pinion integral with the lower end of the shaft, its necessary pitch diameter is reduced, thereby requiring a co-acting gear wheel, to be described, of smaller diameter. However, the gear wheel of smaller diameter provides ample leverage for developing the required power. The combination of the bevel-pinion integral with the shaft, and corresponding small diameter of the bevel gear wheel, renders it possible to construct a brake mechanism of small size and proportion and which is more suitably applicable for attachment to the ends of the cars of different constructions, and furthermore, providing a brake mechanism of light weight. The upward displacement of the vertical shaft 27 is prevented by the bevel-pinion 28, while its downward displacement is prevented by a washer 29, surrounding the shaft 27 and engaging the top of the sleeve-bearing 26. This washer is provided with a groove formed by a pair of spaced upstanding lugs 30, receiving therein a cotter-pin 31, passing through an opening in the vertical shaft 27. The washer 29 rotates with the vertical shaft, thus preventing shearing action of the cotter-pin. At its upper end, the vertical shaft 27 is equipped with a horizontal hand wheel 32 to rotate the same, and secured thereto by any suitable means. Other means may be employed to turn the vertical shaft, such as a lever, or the like.

Arranged within the housing 20 is a horizontal shaft 32′, the inner end of which is journaled in a bearing 33, formed in the vertical plate 21, and the outer end of which is journaled in a bearing 34, formed in the outer side of the housing. The shaft 32′ is held stationary by means of a cotter-pin 35, passing through an opening 36 in the outer end of the shaft 32′ and through openings in lugs 37, formed integral with the housing, as shown.

Rotatable upon the horizontal shaft 32′ is a gear wheel 38 which may be of smaller diameter but will provide ample leverage for developing the required power, which is rendered possible by having the bevel-pinion 28, formed integral with the vertical shaft 27, as hereinbefore explained. This gear wheel is provided upon its outer side with an annular set of gear teeth 39, suitably angularly arranged, in mesh with the bevel-pinion 28 and the gear wheel is provided upon its periphery with an annular set of ratchet teeth 40, for co-action with a pawl, to be described. The gear teeth 39 are positioned inwardly of and adjacent to the ratchet teeth 40, which extend radially outwardly beyond the diameter of the gear wheel. The ratchet teeth 40, with the co-acting pawl prevent the reverse movement of the gear wheel, and these ratchet teeth being located upon the outer periphery of the gear wheel, by construction, are numerous, and positioned to reduce the leverage, or effort required for disengaging the pawl from the same, and also provide for the maximum holding adjustments of the gear wheel by the pawl. Formed integral with the gear wheel 38, and concentric therewith is a tubular chain drum 41, rotatable upon the shaft 32′. This chain drum is positioned upon the outer side of the gear wheel 38 and, therefore, extends from the gear wheel 38 outwardly in a longitudinal direction away from the car body, the shaft 32′ being, of course, horizontally arranged. This chain drum 41 is of constant diameter throughout its effective length, and is designed to produce a uniform power ratio or pull on the chain, to be described, during its operation, when a uniform power is exerted on the hand wheel. The chain drum 41 is provided with a spiral chain guiding rib 42, integral therewith, and a spiral chain bearing or supporting rib 43, also integral therewith. The spiral 43 extends between the turns of the spiral rib 42, while the spiral rib 42 has a much greater radial dimension, and extends radially beyond the rib 43. Both of these spiral ribs cause the chain being wound upon the chain drum 41 to progress away from the gear wheel 38 or the end of the car body, as the brakes are applied.

The numeral 44 designates a chain to be wound upon the chain drum 41, and means are provided to attach the chain to the inner end of the chain drum, adjacent to the inner ends of the spiral ribs or vanes 42 and 43. This means includes a lug 45, Figure 8, integral with the chain drum 41 and gear wheel 38, and this lug has an outer face 46, inclined with respect to the axis of rotation of the chain drum. The first end link 47 of the chain is adapted to have its side laid in contact with the inclined face 46, Figure 5, and is pivoted to the lug 45 by means of a U-bolt 48, the arms of which extend into openings 49 formed in the lug 45, one arm of the U-bolt having an opening 50, formed therein, for the reception of a pin 51. The link 47 is pivotally held by the U-bolt 48, but upon the winding action it will lie flat upon the inclined face 46 which is adjacent to the inner end of the spiral rib 42 and equi-distantly spaced from the turns of the same, or in substantial alinement with the bearing or supporting rib 43. As a result of this arrangement and angular connection, the alternate links of the chain project into the space between the guiding rib 42 and become angularly positioned to contact with the winding drum 41 while their intermediate portions engage the bearing rib 43, Figure 11. The alternate links are, therefore, turned upon their longitudinal axes and are inclined in opposite directions to bring their outer sides in contact with the periphery of the winding drum. This brings the center of the chain in the closest possible relation with the center of axis of rotation of the chain drum, thereby affording the maximum power or leverage. The arrangement and construction is also adapted to provide an equal bearing for all links of the chain, thereby lessening the possibility of distorting the shape of the links in the chain, when the same is being wound upon the chain drum. It might be stated at this point that when the chain is wound upon the chain drum that it is fed longitudinally and outwardly from the car body, for a purpose to be described.

The ratchet teeth 40 are adapted to be engaged by a pawl 53, having a tubular hub 54, provided with a radial notch 55, Figure 9. The tubular hub 54 is adapted to receive a shaft 56, having a radially extending tongue 57, formed integral therewith, between its ends, which tongue is adapted to enter the notch or groove 55. The pawl shaft 56 is provided at its outer end with a head 58, carrying a radially extending segmental stop 59. The inner end of the pawl shaft is adapted to be inserted within an opening or bearing 59, Figure 10, formed in the housing, while the outer end of this shaft is journaled within an opening or bearing 60, formed in the outer portion of the housing Figure 7, and the housing is provided with a radial notch 61, adjacent to the opening 60. The pawl is actuated by a weight 62, provided on its top with a designation "On," as indicated at 63, and upon its bottom with a designation "Off," as indicated at 64. The weight is provided with a radial extension 65, having an opening 66 formed therein, to pivotally receive the pawl shaft 56. The extension 65 also has a radial notch or groove 67, through which the tongue or rib 57 passes. The weight 62 is provided upon one end with a curved recess 68, having stop shoulders 69 and 70. In assembling the pawl and associated elements, the pawl shaft is first inserted through the opening 66 and the tongue 57 passes through the notch or groove 67, the segmental stop 59' being arranged between the shoulders 69 and 70. The weight is therefore pivoted upon the shaft 56. The pawl 53 is now positioned within the pocket 62, and the shaft passed through the opening or bearing 60, and its tongue 57 passing through the notch or slot 61, the shaft passing into the hub 50 of the pawl and the tongue entering the notch or groove 55, the inner end of the shaft finally passing into the opening or bearing 59. This assemblage is made before the gear wheel 38 is positioned within the housing, and when the gear wheel is placed within the housing, the pawl 53 is elevated, and the gear wheel prevents the pawl 53 from moving downwardly sufficiently whereby the pawl shaft 56 could turn downwardly sufficiently to bring the tongue 57 into registration with the notch or groove 61. Hence the pawl shaft is locked within the housing, by the tongue 57 of the pawl shaft engaging behind the wall of the bearing 60, and the pawl shaft cannot be removed prior to the removal of the gear wheel. When the weight 62 is swung to the right, the lower shoulder 70 engages the top of the segmental stop 59', and the weight will then hold the pawl into engagement with the ratchet teeth. When this weight is swung to the left to occupy the outer horizontal position, the opposite shoulder 69 will engage the opposite end of the segmental stop 59', and the weight will retain the pawl out of engagement with the ratchet teeth.

The lower unit of the brake mechanism embodies a bracket or housing 70', bolted or otherwise rigidly attached to the end of the car body 25 adjacent the end thereof. This bracket embodies spaced sides 71, having curved vertical inclined grooves 72 upon its inner side, extending longitudinally of the car body 25 and downwardly in a direction longitudinally of the car body and away from the end thereof. The base of the bracket has a curved set of gear teeth 73, concentric with the grooves 72, as shown. The numeral 74 designates a bell crank, having a curved outer grooved rim 75, for guiding and receiving a horizontal chain 76, extending to the brake rigging and attached to the lever or arm 77, of the bell crank, as indicated at 78. The bell crank is provided with trunnions 79, slidable within the grooves 72 and is also provided with a curved set of gear teeth 80, concentric with the trunnions 79, and engaging the curved set of gear teeth 73. The rim of the bell crank is in the form of an involute curve, increasing in distance from the trunnions 75, in a downward and outward direction. When the lever 77 is pulled upwardly in applying the brakes the bell crank travels downwardly and outwardly longitudinally of the car body, thereby taking advantage of direction, without the loss of power, when the brakes are being applied, and in an opposite direction when the brakes are released. The chain 44 has connection with a link 81, the lower end of which is preferably pivotally connected with the shorter link 82, affording a flexible connection which is adapted to travel beneath the end of the car body, when the brakes are being released. It might be stated at this point that the outward movement longitudinally of the car body, of the lever 77 of the bell crank 75, corresponds to the progressive outward movement of the chain being wound upon the chain drum whereby the connections between the drum and the bell crank remain generally vertical, affording an upward vertical pull on the chain at all times when the brake is being applied. This coordination of outward movements of the connecting parts, at the upper and lower units of the apparatus causes the chain to properly mesh into or with the spiral ribs of the chain drum, thus preventing it from overlapping itself while the brake is being applied and maintaining a constant ratio of braking power, for a constant force applied to the hand wheel.

The outer rim 75 of the bell crank 74 is so proportioned to bring the center of the horizontal chain 76 more closely to the pivot point of the bell crank 74, after the outer pulling lever 77 of the bell crank has passed above the horizontal position, thereby compensating for the loss of power which would naturally be incurred after the pulling lever or arm 77 has passed its horizontal position, if the bearing points of the horizontal chain 76 were equally distant from the hub or pivot 79 of the bell crank. This special shape of the rim or periphery 75 of the bell crank also serves to keep the line of pull of the connection from the bell crank to the cylinder lever, in a substantially constant plane, and prevents possible drag of the rod connection, where it passes between the body and truck bolsters of the car. The downward and outward longitudinal movement of the bell crank, in its bracket, provide additional travel against the resistance of both the horizontal and vertical chains, when the brake is being applied, and this movement, in addition to that obtained by the fact that the chain is wound around the outer rim or periphery 75, of the bell crank, causes more movement or travel of the horizontal chain 76, than would be obtained if the pivot of the bell crank were held in a fixed pivoted position. The rolling or traveling of the teeth 80 of the bell crank upon the corresponding teeth 73 in the bracket, reduces friction between the bell crank and the bracket, which would ordinarily occur, if the pivot of the bell crank were fixed.

The operation of the apparatus is as follows:

To apply the brakes, the operator shifts the weight 62 to the inner horizontal position, and the pawl 53 will then engage the ratchet teeth 40 of the gear wheel 38. The hand wheel 32 is turned clockwise, rotating the vertical shaft 27, which turns the bevel-pinion 28 integral with the lower end thereof. This bevel-pinion turns the gear wheel 38, turning the chain drum 41. The chain 44 being attached to the inner end of the chain drum is progressively wound upon the chain drum and follows the travel of the guiding ribs 42, the unwound portion of the chain 44 being progressively fed outwardly in a direction longitudinally of the car body. The alternate links of the chain being oppositely inclined upon the winding drum, between the turns of the ribs 42, their intermediate portions rest upon the bearing rib 43 and their outer sides upon the periphery of the winding drum. While the chain 44 is thus moving upwardly, the arm of lever 77, of the bell crank 74 is moving upwardly and longitudinally and outwardly with respect to the car body. This results in the connections, including the chain 44 and associated elements, being maintained substantially vertical and a substantially vertical pull may, therefore, be transmitted from the upper unit to the lower unit of the mechanism. When the brakes are to be released, the weight 53 is also swung to the outer horizontal position and the reverse of this operation takes place.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. In a railway car hand brake, a winding drum mounted at the end of the car and having its axis of rotation extending longitudinally away from the car, a flexible element connected with the drum to be wound thereon, means to guide the flexible element in its winding movement upon the drum so that it travels toward the outer end of drum and away from the end of the car, a power transmitting unit mounted upon the car beneath the drum and having a part connected with the flexible element and adapted when moved upwardly by the flexible element to travel longitudinally away from the end of the car whereby a substantially vertical pull is transmitted to said part, and means adapted to connect the power transmitting unit with brake rigging.

2. In a railway car hand brake, a winding drum mounted at one end of the car and having its axis of rotation extending longitudinally of the car, a flexible element connected with the drum to be wound thereon, means to guide the flexible element upon the drum to cause the flexible element to travel toward the outer end of the drum when being wound thereon, a power transmitting unit mounted upon the car beneath the drum and adapted for connection with the brake rigging and having a part adapted to travel longitudinally and outwardly in relation to the car as the brakes are being applied, said flexible element being connected with said parts.

3. In a railway car hand brake, a winding drum mounted upon the end of a car and having its longitudinal axis extending longitudinally of the car, a pulling element attached to the inner end of the drum and adapted when wound thereon to be progressively fed longitudinally of the drum away from the end of the car, a bell crank mounted upon a car beneath the drum and having means to progressively feed the same outwardly in a direction longitudinal of the car when power is applied thereto, said bell crank being connected with the pulling element, and means connected with the bell crank and adapted for connection with brake rigging.

In testimony whereof I affix my signature.

AUGUSTUS F. KLASING.